(12) United States Patent
Rajappa et al.

(10) Patent No.: US 6,748,513 B1
(45) Date of Patent: Jun. 8, 2004

(54) METHOD AND APPARATUS FOR A LOW LATENCY SOURCE-SYNCHRONOUS ADDRESS RECEIVER FOR A HOST SYSTEM BUS IN A MEMORY CONTROLLER

(75) Inventors: Srinivasan T. Rajappa, Folsom, CA (US); Romesh B. Trivedi, Orangevale, CA (US); Rajagopal Subramanian, Orangevale, CA (US); Zohar Bogin, Folsom, CA (US); Serafin Garcia, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 560 days.

(21) Appl. No.: 09/665,922

(22) Filed: Sep. 20, 2000

(51) Int. Cl.[7] ............................ G06F 12/00; G06F 13/00

(52) U.S. Cl. .................. 711/211; 711/200; 365/230.08; 365/230.09

(58) Field of Search ................... 711/211, 3, 220; 365/230; 360/230.08, 230.09

(56) References Cited

U.S. PATENT DOCUMENTS 6,061,293 A * 5/2000 Miller et al. ........... 365/230.08
6,385,710 B1 * 5/2002 Goldman et al. ........... 711/169

* cited by examiner

Primary Examiner—Tuan V. Thai
Assistant Examiner—H. B. Patel
(74) Attorney, Agent, or Firm—Blakely, Sokoloff, Taylor & Zafman LLP (57) ABSTRACT

A method and apparatus for a source synchronous address receiver for a system bus is described. A flow-through between a system bus address input to a memory bus is controlled by two inputs: one is a source synchronous address strobe directing the receiver to latch the address and store data, while the other is a protocol signal, signaling the beginning of the address transfer. A flow-through circuit generates an enable signal in response to a digital address strobe signal and a digital address select signal to generate, prior to receipt of the address packet, an enable signal for a flow-through gate having the address packet and the enable signal as inputs. The flow-through gate provides the first component of the digital address packet (transaction address) to a chipset once the digital address packet appears on the address pin.

23 Claims, 7 Drawing Sheets

Source Synchronous Address Receiver 200

METHOD AND APPARATUS FOR A LOW LATENCY SOURCE-SYNCHRONOUS ADDRESS RECEIVER FOR A HOST SYSTEM BUS IN A MEMORY CONTROLLER

FIELD OF THE INVENTION

The present invention relates generally to memory controllers. In particular, the present invention relates to an apparatus and method for a low latency source-synchronous address receiver for a system bus in a memory controller.

BACKGROUND OF THE INVENTION

Figure 1:
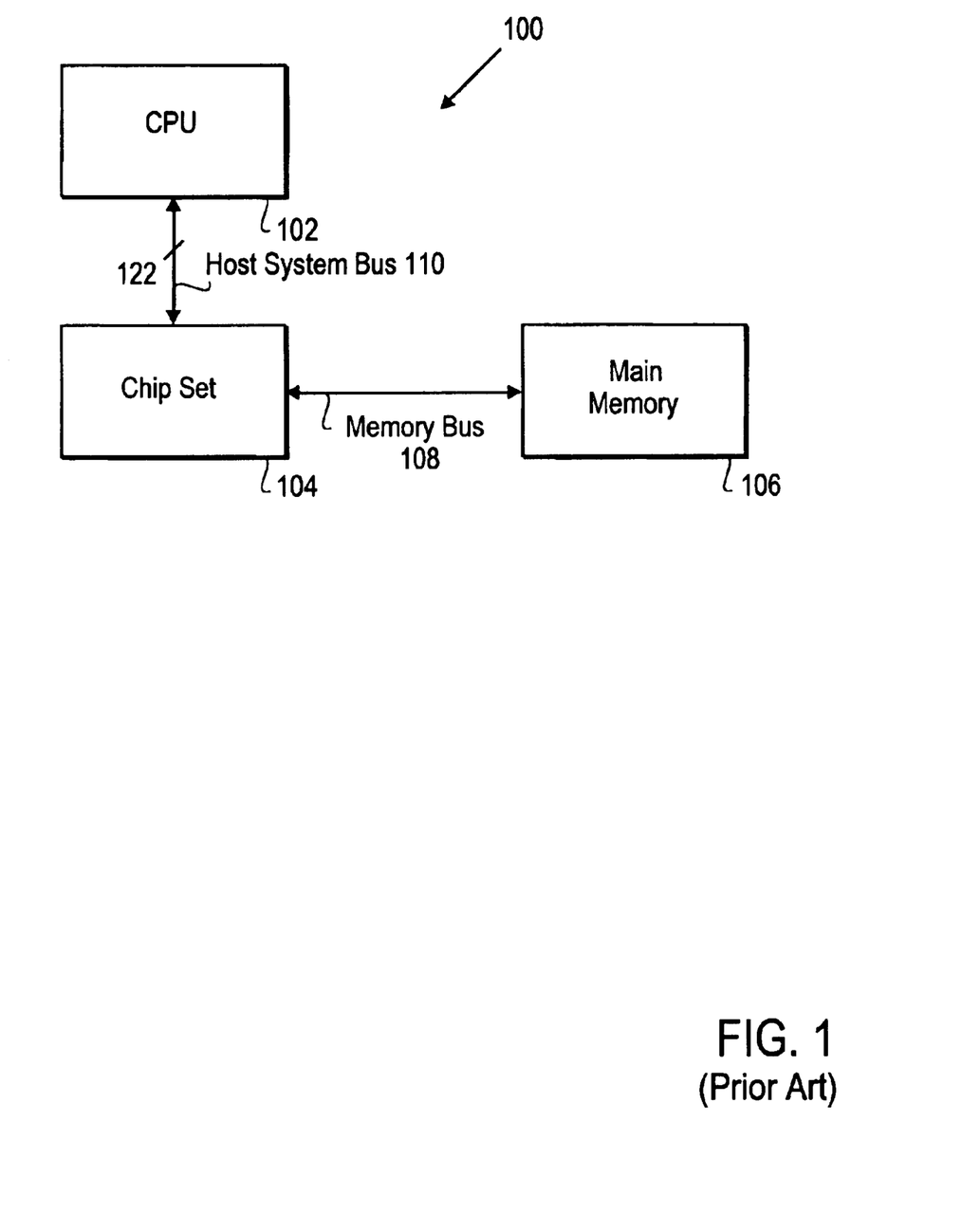
FIG. 1 depicts a block diagram of a conventional memory controller architecture system in which the teachings of the present invention may be implemented.
Figure 2:
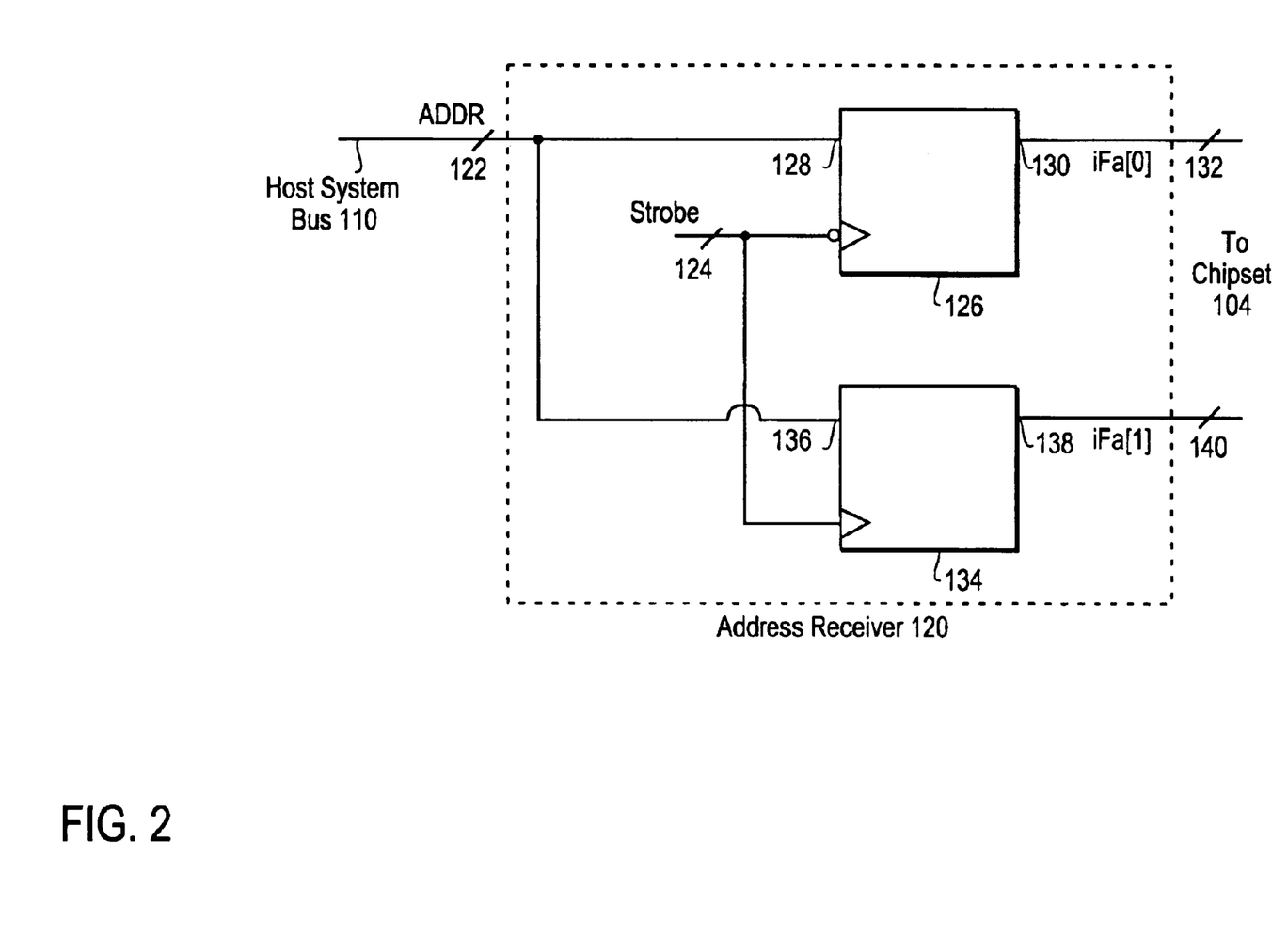
FIG. 2 depicts a block diagram of an address receiver for a source synchronous bus.

FIG. 1 depicts a conventional memory controller architecture system 100. The memory controller architecture 100 generally includes a CPU 102, a chipset 104 and a main memory 106. The CPU 102 is coupled to the chipset 104 by a host system bus 110 while the main memory 106 is coupled to the chipset 104 by a memory bus 108. The chipset 104 receives data requests from the CPU 102 including address packets 122 received on the host system bus 110. Once the address packet is received by the chipset 104, the chipset 104 decodes the address packet 122 in order to generate an address of the requested data in main memory 106 and return the requested data to the CPU 102.

The host system bus 110 which connects the CPU 102 to the chipset 104 is generally controlled by a common clock interface. In other words, the speed at which the host system bus 110 can run is limited by the speed of the system clock, which generally runs at 100 megahertz or 133 megahertz. As technology pushes the processing speed of CPUs, such as CPU 102, common clock interface buses, such as the host system bus 110, run the risk of creating a bottleneck in memory controller architectures, such as the memory controller architecture 100 as depicted in FIG. 1. In fact, these advances in processor design have pushed memory controller systems to a level where the speed of a bus or an architecture cannot be scaled using an increased clock frequency. One technique for accommodating the increased processor speed of a CPU, such as CPU 102, is to replace the host system bus 110 with a source synchronous system bus.

Unfortunately phase zero information (not shown) of the address packet 122 is vital for decoding of the address packet 122 by the chipset 104. However, a memory controller system, such as a memory controller system 100 as depicted in FIG. 1, requires a low latency path between the system bus 110 address input to the memory bus 108 for high performance. Unless the phase zero address information can be instantly provided to the core chipset logic 104 once the address packet appears on an address pin, any benefits provided by using a source synchronous host system bus are lost.

BRIEF DESCRIPTION OF THE DRAWINGS

The features, aspects, and advantages of the present invention will become more fully apparent from the following detailed description and appended claims when taken in conjunction with accompanying drawings in which:

DETAILED DESCRIPTION OF THE INVENTION

The present invention overcomes the problems in the existing art described above by providing an apparatus and method for a low latency source synchronous address receiver for a system bus in a memory controller. The present invention achieves a low latency path between a system bus address input to a memory bus resulting in a high performance memory controller by using a flow-through path. This flow-through path is controlled by two inputs: one is a source synchronous strobe directing the address receiver to latch an address and store it, while the other is a protocol signal that signals the beginning of an address transfer which enables the flow-through path.

In the following detailed description, numerous specific details are set forth in order to provide a thorough understanding of the present invention. However, one having ordinary skill in the art should recognize that the invention may be practiced without these specific details. For example, various signals, layout patterns, memory cell configurations and circuits, and logic circuits may be modified according to the teachings of the present invention. The following description provides examples, and the accompanying drawings show various examples for the purposes of illustration. However, these examples should not be construed in a limiting sense as they are merely intended to provide examples of the present invention rather than to provide an exhaustive list of all possible implementations of the present invention. In some instances, well-known structures, devices, and techniques have not been shown in detail to avoid obscuring the present invention.

The following system architecture describes specific embodiments for implementing a double-pumped, source synchronous address receiver for a system bus as taught by the present invention. However, those skilled in the art will appreciate that the teachings of the invention may be implemented using various circuit design modifications. Specifically, the flow-through path as taught by the present invention can be implemented using various logic design techniques while remaining within the scope of the present invention. Moreover, although the present invention describes a two input, source synchronous address receiver, those skilled in the art will realize that the teachings of the present invention can be easily extended to higher order interfaces by scaling the receiver structure.

Figure 3:
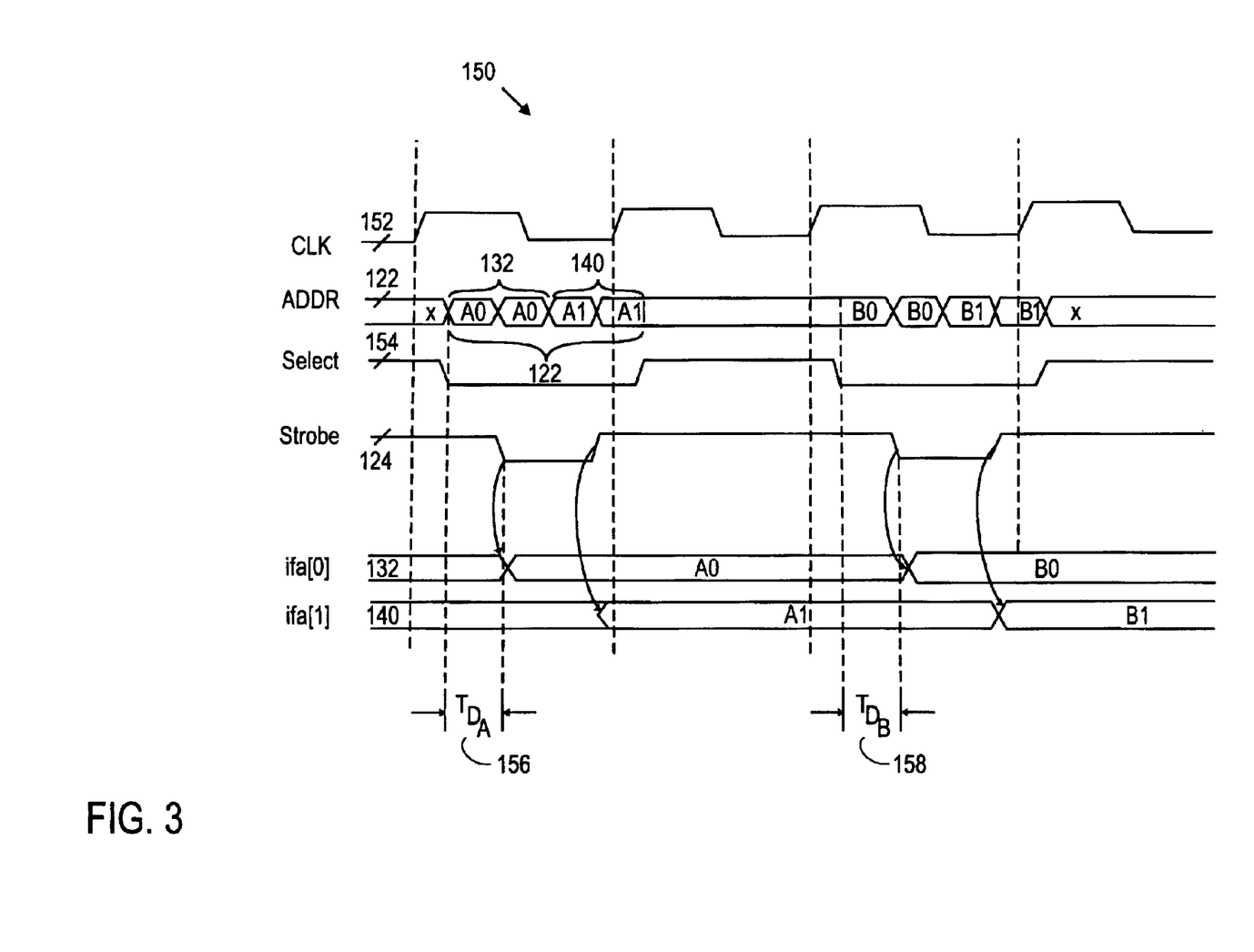
FIG. 3 depicts a timing diagram illustrating the functionality of the address receiver as depicted in FIG. 2.

As depicted in FIG. 3, the address packet 122 includes a first component or phase zero component 132 and a second component or phase one component 140. The phase zero component 132 of the address packet 122 describes a transaction type of the address packet 122 (transaction address), indicating whether the address of the requested data is memory based or IO based. Consequently, this information is crucial to the memory controller architecture 100 for high-speed decoding of the address packet 122 by the chipset 104. The phase one component 140 of the address packet 122 contains address attributes of the address packet including data size/length attributes, byte enables, defer ID, extended functions, cycle types, etc. The information provided by the phase one component 140 of the address packet 122 is not as critical to the decoding stages as the phase zero component 114 of the address packet 112.

As illustrated, a phase zero component 132 of the address packet 122 appears at an output 130 of the first flip-flop 126 in response to the falling edge of the strobe signal. Likewise, the phase one component 140 of the address packet 122 would appear at an output 138 of the second flip-flop 134 in response to the rising edge of the strobe signal 124. Unfortunately, the address receiver 120 as depicted in FIG. 3 introduces a delay (TDA) 156, as indicated in the timing diagram, of as much as a few nanoseconds in producing the phase zero component 132 of the address packet 122 at the output 130 of the first flip-flop 126.

Figure 4A:
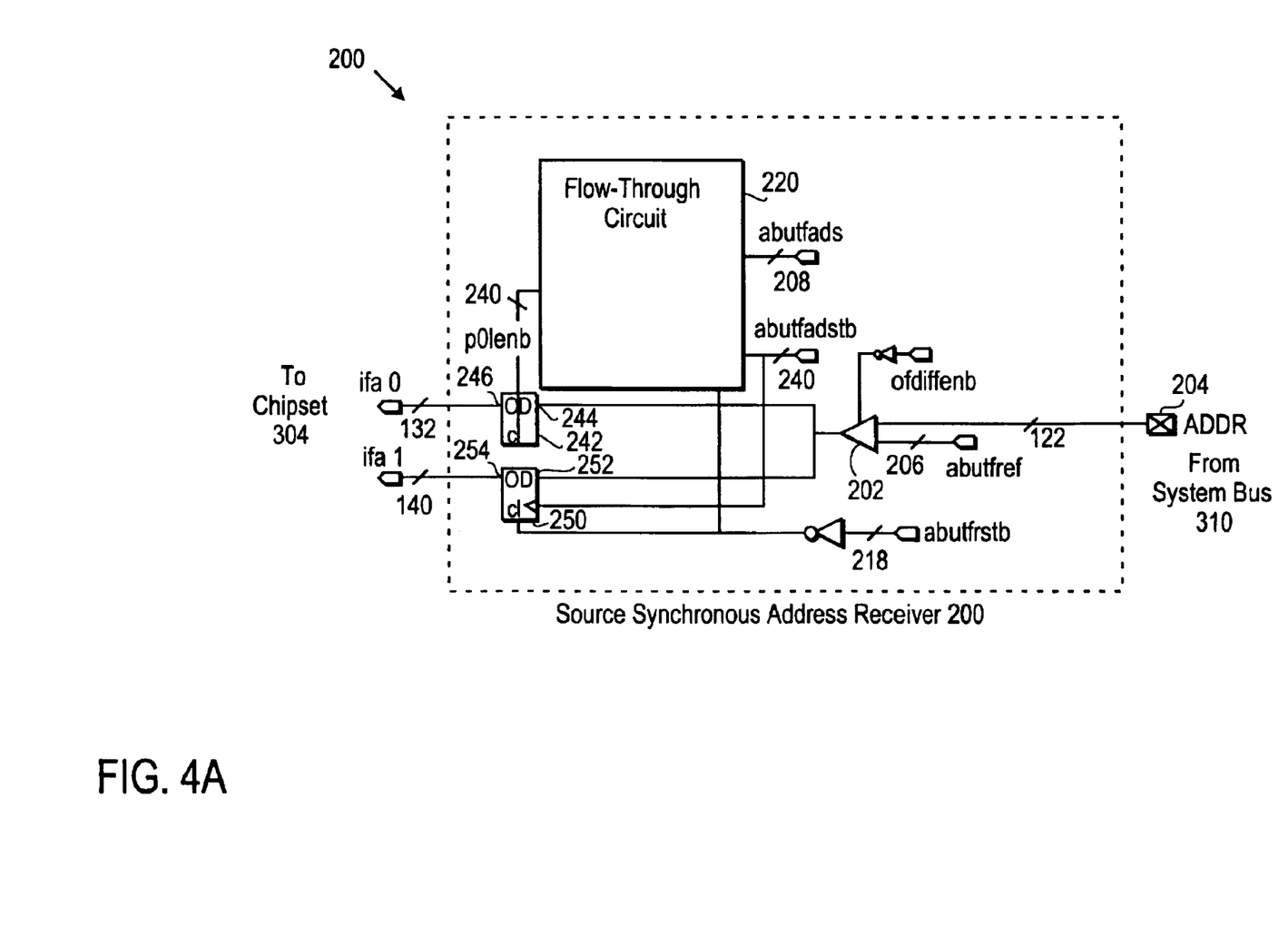
FIG. 4A depicts a diagram of a source synchronous address receiver according to a first embodiment of the present invention.
Figure 4B:
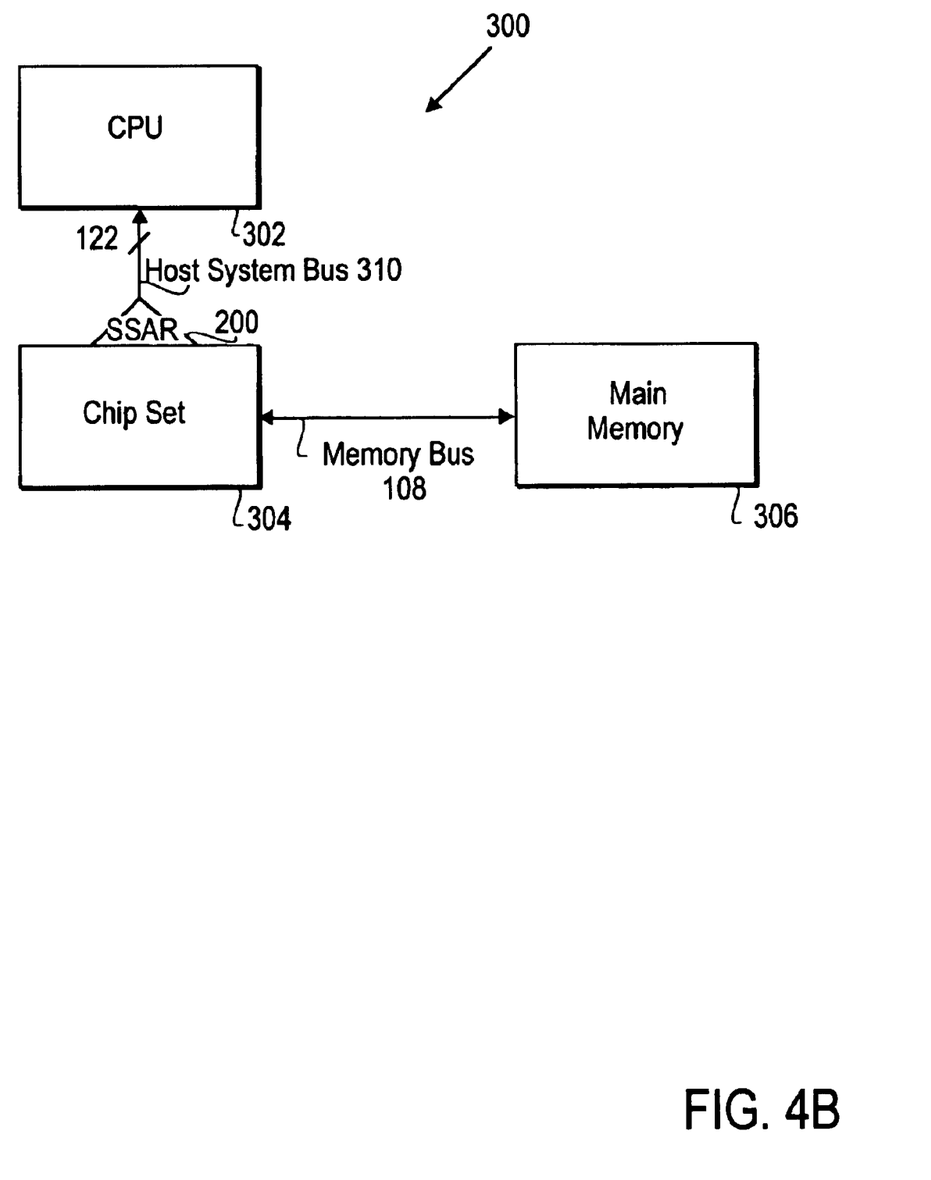
FIG. 4B depicts a block diagram of a conventional memory controller architecture system according to an embodiment of the present invention.

FIG. 4A depicts a source synchronous address receiver (SSAR) 200 for use in a memory controller system architecture, such as in a host system bus of a memory controller architecture 300 as depicted in FIG. 4B. The source synchronous address receiver 200 includes an input differential amplifier 202 that compares an address packet 122 received on an address pin 204 for a data request against a reference voltage 206 in order to generate a digital address packet as the address packet 122. The address packet 122 includes a first, or phase zero component 132 (IFA[0]), describing a transaction type of the address packet 122 (transaction address) and a second, or phase one component 140 (IFA[1]), describing attributes of the address packet 122 as described above with reference to FIG. 3. A flow-through circuit 220 receives a digital address strobe signal 210 and a digital address select signal 208. The digital address strobe signal 210 is a digital version of an analog source synchronous strobe signal 124 that directs the address receiver 200 to latch and store address information available on an address system bus such as the system bus 310. The digital address select signal 208 is generated from an analog common clock protocol signal 154 that signals the beginning of an address transfer and is used to enable a flow-through path as described below.

A flow-through circuit 220 generates an enable signal 240 in response to the digital address strobe signal 210 and the digital address select signal 208. The enable signal 240 is then provided to a flow-through gate 242 having the address packet as an input 244. The flow-through gate 242 provides the first or phase zero component 132 of the address packet 122 (transaction address) to a chipset, such as chipset 304, once the address packet 122 appears on the address pin 204. In other words, the flow-through gate 242 provides a flow-through path from the address pin 204 to the chipset 304 for the transaction address 122 to expedite the initiation of decoding of the address packet 132 by the chipset 304. A first flip-flop 250 receives the digital address packet 122 and the digital address strobe signal 210 as inputs and provides the second or phase one component 140 of the address packet 122 to the chipset in response to the address strobe signal 208. Once the second, or phase one component 140, of the address packet 122 is provided to the chipset 304, the chipset 304 can complete decoding of the address packet 122.

Figure 5:
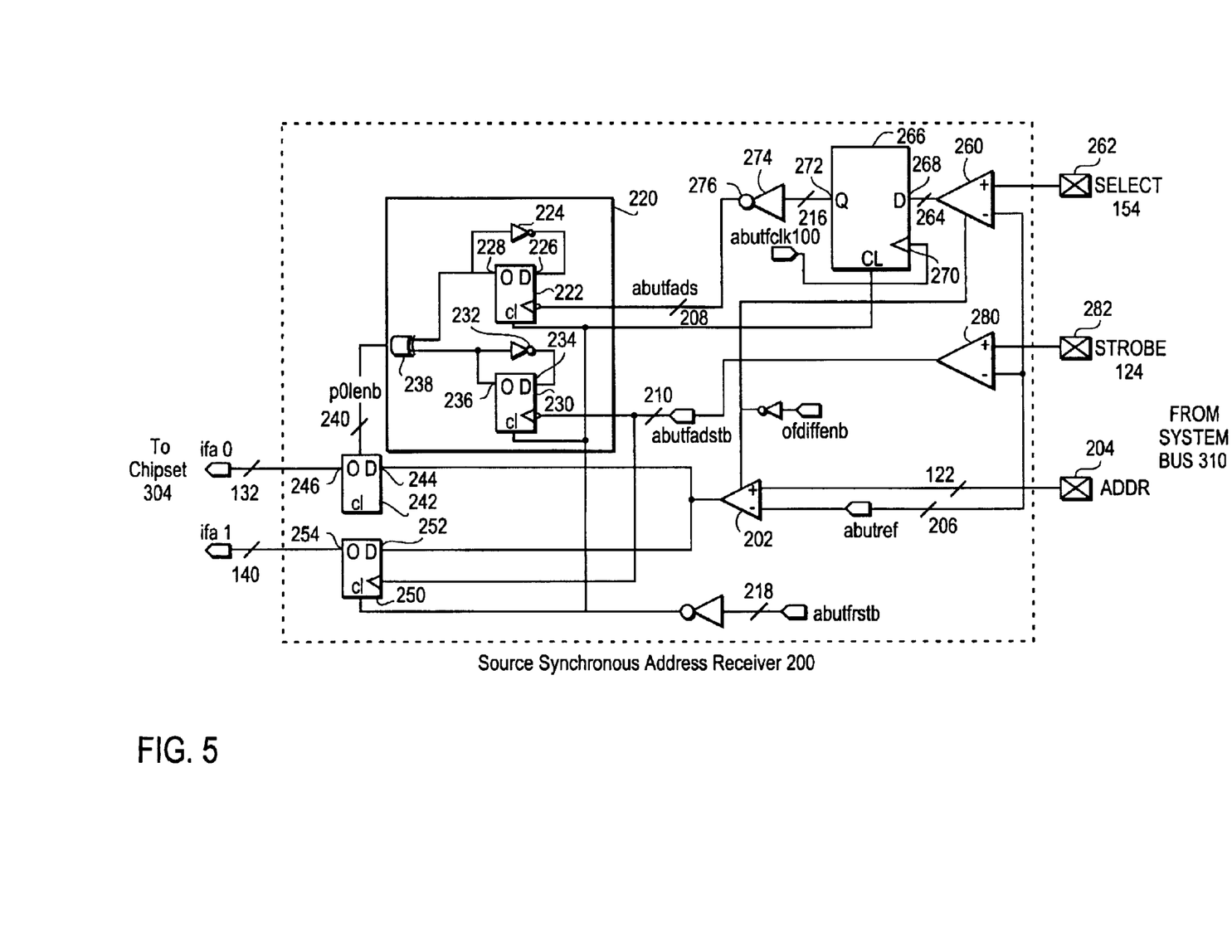
FIG. 5 depicts the source synchronous address receiver according to an exemplary embodiment of the present invention.

FIG. 5 depicts the source synchronous address receiver 200 according to an exemplary embodiment of the invention. The flow-through circuit 220 further includes a second flip-flop 222, including a feedback inverter 224 coupled between an input 226 and an output 228 of the second flip-flop 222. The second flip-flop 222 also includes the digital address select signal 208 as a clock pulse input. A third flip-flop 230 also includes a feedback inverter 232 coupled between an input 234 and an output 236 of the third flip-flop 230. The third flip-flop 230 also includes the digital address strobe signal 210 as a clock pulse input. An exclusive-OR gate 238 includes the output of the second flip-flop 222 and the output of the third flip-flop 230 as inputs in order to generate the enable signal 240 for the flow-through gate 242.

In one embodiment, the address receiver 200 also includes a first differential amplifier 260 that compares the analog common clock protocol signal 154, received on an address select pin 262, against the reference voltage 206 in order to generate a digital common clock protocol signal 264. A fourth flip-flop 266 receives the digital common clock protocol signal into signal 264 as an input 268 and a common clock signal (ABUTFCLK 100) as a clock pulse input 270. Once received, the fourth flip-flop 266 generates a flopped address select signal 216 at an output 272. An inverter 274 then receives the flopped address select signal 216 and generates the digital address select signal 208 at an output 276 of the inverter 274 for input to the flow-through circuit 220.

The source synchronous address receiver 200 also includes a second differential amplifier 280 that compares an analog address strobe signal 124 received on a address strobe pin 282 against the reference voltage 206 in order to generate the digital address strobe signal 210. The source-synchronous address receiver 200 is preferably used for the system address bus 310 of the memory controller 300 as depicted in FIG. 4B. The CPU 302 of the memory controller 300 is preferably a Willamette® generation CPU as manufactured by the Intel Corporation. The flow-through gate 242 is preferably a latch, although various other logic gates are within the contemplation of the present invention. In addition, the first flip-flop 250, the second flip-flop 222, the third flip-flop 230, and the fourth flip-flop 266 are preferably data flip-flops, although various types of logic gates are within the contemplation of the present invention.

Figure 6:
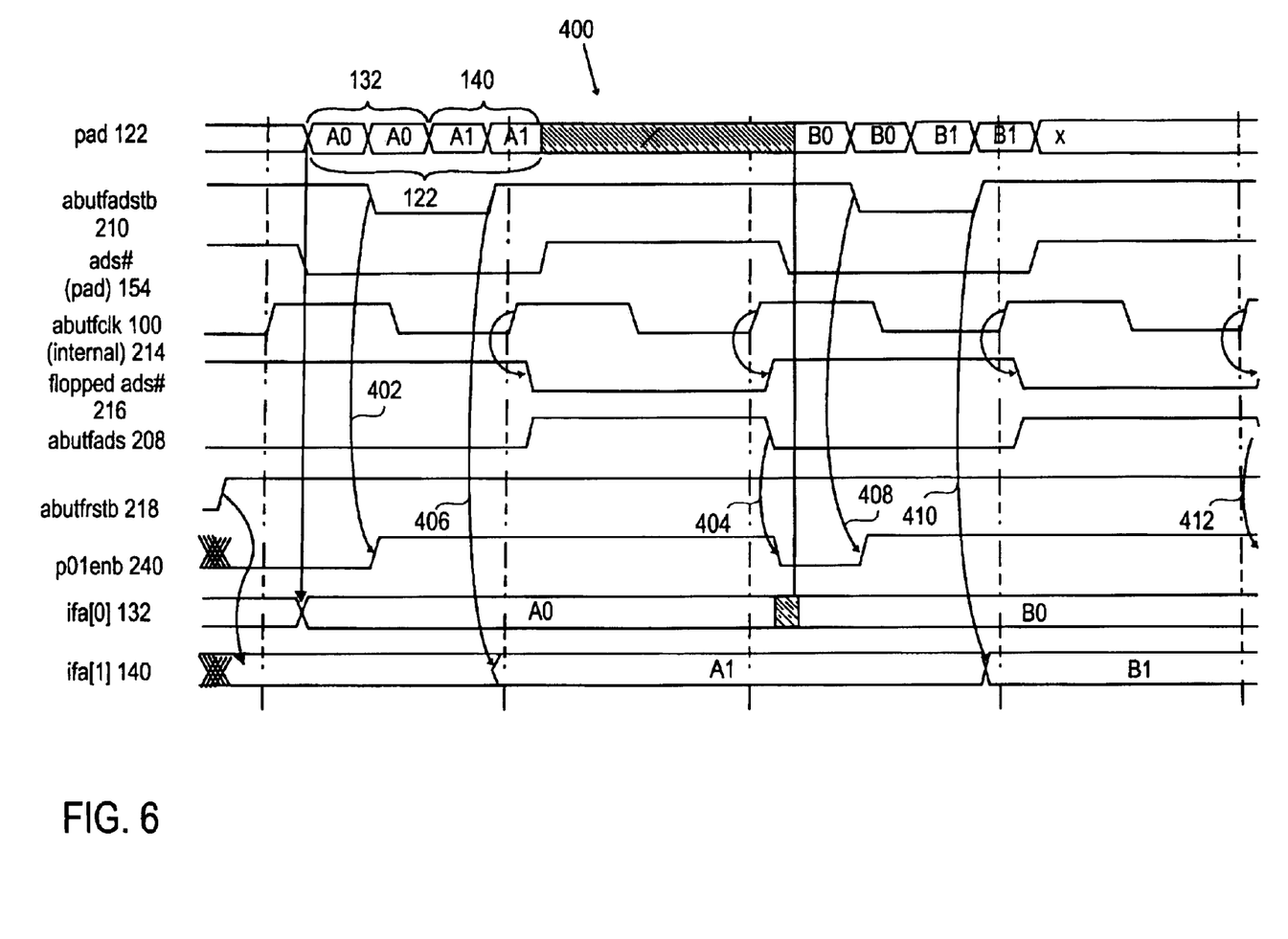
FIG. 6 depicts a diagram illustrating the functionality of the source synchronous address receiver as depicted in FIG. 5.

The operation of the source synchronous address receiver 200 in one embodiment of the present invention is now described with reference to FIGS. 5 and 6. Referring to FIG. 6, a timing diagram 400 is depicted illustrating one embodiment of the present invention. An address packet 122 (pad) as depicted in FIG. 6 illustrates the first component, or phase zero component 132 (A0), and the second, or phase one component 140 (A1). The enable signal 240 (P0LENB) is initially low. Since the flow-through gate 242 is active low enabled, during reset of the enable signal 240, the flow-through gate is enabled or active low, thus making the flow-through gate 242 transparent. This enables the flow-through path from the address pin 204 to the core logic of the chipset 304 (FIG. 4B) for the first component, or phase zero component 132, of the address packet 122. In one embodiment, at the moment the phase zero component 132 of the address packet 122 appears on the address pin 204, the data is immediately made available to the chipset as IFA(0). Enabling of the flow-through gate 242 is toggled by the falling edge of the digital source synchronous address strobe signal 210 (ABUTFADSTB), thus closing the flow-through gate 242 as indicated by the arrow 402. The flow-through gate 242 is again made transparent by the falling edge of the digital address select signal 208 (ABUTFADS), thus enabling the flow-through path for next phase zero address component 132 of the address packet 122 (B0) as indicated by the arrow 404.

The phase one component 140 of the address packet 122 (A1) is sampled at the rising edge of the digital address strobe signal 210 and appears as IFA[1] as indicated by the arrow 406. The digital address select signal 208 (ABUWFADS) is essentially a complement of the flopped address select signal 216 (flopped ADS#) as described with reference to FIG. 5 which is generated from the digital common clock protocol signal 264. Once the phase one component 140 of the address packet 122 is received by the chipset 304 (FIG. 4B), the chipset 304 (FIG. 4B) can complete decoding of the address packet 122. Once the address packet is decoded by the chipset 304, the decoded address is provided to the main memory 306 via the memory bus 308 in order to retrieve the data requested by the CPU 302 and consequently transferred to the CPU 302 as depicted in FIG. 4B. Consequently, in one embodiment a flow-through path achieves a low-latency path between the system bus address input to the memory bus resulting in a high performance memory controller, which can accommodate the increased CPU processing speeds required in today's technology, as well as future processing speeds.

The present invention provides many advantages over known techniques. The techniques taught by the present invention help achieve one of the main goals of memory controllers. This goal is to achieve a low latency path between the host system bus and the memory bus to enable a high performance memory controller. The present invention achieves this low latency path by using a flow-through path. This flow-through path is controlled by two inputs, one is a source synchronous strobe directing the apparatus to latch an address and store it, while the other is a common clock protocol signal that signals the beginning of the address transfer which enables the flow-through path. This use of source synchronous and common clock signals to achieve the desired end result (minimal latency to the memory address) is unique in its implementation. This design can be used in future implementations of source synchronous system address buses and memory controller devices.

Having disclosed exemplary embodiments and the best mode, modifications and variations may be made to the disclosed embodiments while remaining within the scope of the invention as defined by the following claims.

What is claimed is:

1. A method comprising:

generating an enable signal in response to a digital address strobe signal and a digital address select signal to activate the enable signal prior to receipt of an address packet;

receiving an address packet on an address pin for data requested from a processor on a system bus, the address packet having a first component describing a transaction type of the address packet and a second component describing attributes of the address packet;

providing a flow-through path from the address pin to a chipset for the first component of the address packet in response to the enable signal, such that the first component of the address packet is provided to the chipset once the address packet appears on the address pin to expedite initiation of decoding of the address packet by the chipset; and providing the second component of the digital address packet to the chipset in response to the digital address strobe signal, such that the chipset can complete decoding of the address packet.

2. The method of claim 1, wherein the generating of the enable signal further comprises:

feeding the digital address select signal as a clock pulse input of a first gate including a feed-back inverter coupled between an input and an output of the first gate;

feeding the digital address strobe signal as a clock pulse input of a second flip-flop including a feed-back inverter coupled between an input and an output of the second flip-flop; and performing an exclusive-OR operation on an output of the first gate and an output of the second gate to generate the enable signal.

3. The method of claim 1, wherein the generating of the enable signal further comprises:

receiving an analog source synchronous strobe signal on an address strobe pin; and converting the analog address strobe signal to a digital address strobe signal as the digital address strobe signal using a differential amplifier and a reference voltage.

4. The method of claim 1, wherein the generating of the enable signal, further comprises:

receiving an analog common clock protocol signal on an address select pin;

converting the analog common clock protocol signal into a digital common clock protocol signal using a differential amplifier and a reference voltage;

feeding the digital common clock protocol signal as an input to a first gate and a common clock signal as a clock pulse input of the first gate to generate a flopped address select signal at an output of the first gate; and feeding the flopped address select signal to an input of an inverter to generate the digital address select signal at an output of the inverter.

5. The method of claim 1, further comprising:

deactivating the enable signal in response to the detection of a transition in the digital address strobe signal; and reactivating the enable signals, prior to receipt of a next address packet, in response to the detection of a transition in the digital address select signal.

6. The method of claim 5, wherein deactivating the enable signal further comprises:

detecting a falling signal transition of the digital address strobe signal; and driving the enable signal high to disable the enable signal.

7. The method of claim 5, wherein reactivating the enable signal further comprises:

detecting a falling signal transition of the digital address select signal; and driving the enable signal low to activate the enable signal prior to receipt of the next address packet.

8. The method of claim 1, wherein the enable signal is an active low signal, such that during reset of the enable signal, the enable signal is active prior to receipt of the address packet.

9. An address receiver, comprising:

a flow-through circuit to generate an enable signal in response to a digital address strobe signal and a digital address select signal to activate the enable signal prior to receipt of an address packet;

an input differential amplifier to compare an address packet received on an address pin for a data request against a reference voltage and generate a digital address packet, the digital address packet having a first component describing a transaction type of the address packet and a second component describing attributes of the address packet;

a flow-through gate having the digital address packet and the enable signal as inputs, the flow-through gate providing the first component of the digital address packet to a chipset in response to the enable signal once the digital address packet appears on the address pin, thereby providing a flow through path from the address pin to the chipset for the first component of the digital address packet to expedite initiation of decoding of the address packet by the chipset; and a non flow-through gate having the digital address packet and a digital address strobe signal as inputs and providing the second component of the digital address packet to the chipset in response to the digital address strobe signal, such that the chipset can complete decoding of the address packet.

10. The address receiver of claim 9, wherein the flow-through circuit further comprises:

a first gate including a feed-back inverter coupled between an input and an output of the first gate and the digital address select signal as a clock pulse input of the first gate;

a second gate including a feed-back inverter coupled between an input and an output of the second gate and the digital address strobe signal as a clock pulse input of the second gate; and an exclusive-OR gate having an output of the first gate and an output of the second gate as inputs to generate the enable signal as an output.

11. The address receiver of claim 10, wherein the first non flow-through gate is a data flip-flop, the first gate is a data flip-flop and the second gate is a data flip-flop.

12. The address receiver of claim 9, further comprising:

a first differential amplifier to compare a common clock protocol signal received on an address select pin against a reference voltage and generate a digital common clock protocol signal;

a first gate to receive the digital common clock protocol signal as an input and a common clock signal as a clock pulse input and generate a flopped address select signal at an output of the first gate; and an inverter to receive the flopped address select signal and generate the digital address select signal at an output of the inverter for input to the flow-through circuit.

13. The address receiver of claim 12, wherein the non flow-through gate is a data flip-flop and the first gate flip-flop is a data flip-flop.

14. The address receiver of claim 9, further comprising:

a second differential amplifier to compare an analog address strobe signal received on an address strobe pin against a reference voltage and generate the digital address strobe signal.

15. The address receiver of claim 9, wherein the flow-through gate is an active low enabled latch.

16. A memory controller comprising:

a chipset coupled to the memory by a memory bus;

a system bus coupling a processor to the chipset, the chipset decoding an address packet on the system bus for data requested by the processor from the memory, wherein the system bus includes a source-synchronous address receiver including:

a flow-through circuit to generate an enable signal in response to a digital address strobe signal and a digital address select signal to activate the enable signal prior to receipt of an address packet;

a flow-through gate having the digital address packet and the enable signal as inputs, the flow-through gate to provide the first component of the digital address packet to a chipset in response to the enable signal once the digital address packet appears on an address pin, thereby providing a flow-through path from the address pin to the chipset for the first component of the digital address packet to expedite initiation of decoding of the address packet by the chipset; and a non flow-through gate having the digital address packet and the digital address strobe signal as inputs and providing the second component of the digital address packet to the chipset in response to the digital address strobe signal, such that the chipset can complete decoding of the address packet.

17. The memory controller of claim 16, wherein the flow-through circuit further comprises:

a first gate including a feed-back inverter coupled between an input and an output of the first gate and the digital address select signal as a clock pulse input of the first gate;

a second gate including a feed-back inverter coupled between an input and an output of the second gate and the digital address strobe signal as a clock pulse input of the second gate; and an exclusive-OR gate having an output of the first gate and an output of the second gate as inputs to generate the enable signal as an output.

18. The memory controller of claim 16, wherein the flow through circuit to:

deactivate the enable signal in response to the detection of a transition in the digital address strobe signal and to reactivate the enable signal, prior to receipt of a next address packet, in response to the detection of a transition in the digital address select signal.

19. The memory controller of claim 16, further comprising:

an input differential amplifier to compare the address packet received for the data request on the address pin against a reference voltage and generate a digital address packet, the digital address packet having the first component describing an address transaction type and the second component describing attributes of the address;

a first differential amplifier to compare an analog common clock protocol signal received on an address select pin against a reference voltage and generate a digital common clock protocol signal;

a first gate to receive the digital common clock protocol signal as an input and a common clock signal as a clock pulse input and generate a flopped address select signal at an output of the first gate; and an inverter to receive the flopped address select signal and generate the digital address select signal at an output of the inverter for input to the flow-through circuit.

20. The memory controller of claim 19, wherein the non flow-through data is a data flip-flop and the first gate is a data flip-flop.

21. The memory controller of claim 16, further comprising:

a second differential amplifier to compare an analog source synchronous strobe signal received on an address strobe pin against a reference voltage and generate the digital address strobe signal.

22. The memory controller of claim 16, wherein the flow-through gate is an active low enabled latch.

23. The memory controller of claim 16, wherein the non flow-through data is a data flip-flop and the first gate is a data flip-flop.

* * * * *

UNITED STATES PATENT AND TRADEMARK OFFICE
CERTIFICATE OF CORRECTION

PATENT NO. : 6,748,513 B1
DATED : June 8, 2004
INVENTOR(S) : Rajappa et al.

It is certified that error appears in the above-identified patent and that said Letters Patent is hereby corrected as shown below:

<u>Column 5,</u>
Line 5, delete "(ABUWFADS)" and insert -- ABUTFADS --.

<u>Column 7,</u>
Line 27, delete "first".

Signed and Sealed this

Seventeenth Day of August, 2004

JON W. DUDAS
*Acting Director of the United States Patent and Trademark Office*